(12) United States Patent
Summerer et al.

(10) Patent No.: US 10,722,981 B2
(45) Date of Patent: Jul. 28, 2020

(54) DEVICE FOR CUTTING SHEET METAL PLATES OUT OF A SHEET METAL STRIP

(71) Applicant: SCHULER AUTOMATION GMBH & CO. KG, Hessdorf (DE)

(72) Inventors: Matthias Summerer, Altdorf (DE); Alexander Seitz, Erlangen (DE)

(73) Assignee: SCHULER PRESSEN GMBH, Hessdorf (DE)

( * ) Notice: Subject to any disclaimer, the term of this patent is extended or adjusted under 35 U.S.C. 154(b) by 247 days.

(21) Appl. No.: 15/746,641

(22) PCT Filed: Jul. 28, 2016

(86) PCT No.: PCT/EP2016/068085
§ 371 (c)(1),
(2) Date: Jan. 22, 2018

(87) PCT Pub. No.: WO2017/045821
PCT Pub. Date: Mar. 23, 2017

(65) Prior Publication Data
US 2018/0214987 A1 Aug. 2, 2018

(30) Foreign Application Priority Data
Sep. 28, 2015 (DE) .................. 10 2015 218 649

(51) Int. Cl.
*B23K 26/38* (2014.01)
*B23K 37/04* (2006.01)
(Continued)

(52) U.S. Cl.
CPC .............. *B23K 26/38* (2013.01); *B23K 26/02* (2013.01); *B23K 26/0838* (2013.01);
(Continued)

(58) Field of Classification Search
CPC .............. B26D 2007/206; B26D 1/605; B23K 26/704; B23K 26/02; B23K 26/0838;
(Continued)

(56) References Cited

U.S. PATENT DOCUMENTS 4,790,224 A * 12/1988 Krutilla ................ B26D 7/0608
198/345.2
4,993,296 A * 2/1991 Nasu ........................ B23Q 5/34
83/422

(Continued)

FOREIGN PATENT DOCUMENTS

DE 10 2004 034 256 A1 2/2006
DE 10 2011 051 170 A1 12/2012
(Continued)

OTHER PUBLICATIONS

PCT/ISA/210, "International Search Report for International Application No. PCT/EP2016/068085", dated Oct. 24, 2016.
(Continued)

*Primary Examiner* — Paul R Durand
*Assistant Examiner* — Robert K Nichols, II
(74) *Attorney, Agent, or Firm* — Manabu Kanesaka

(57) ABSTRACT

A device for cutting sheet metal plates out of a sheet metal strip includes a laser cutting device moving back and forth in a transport direction of the sheet metal strip and a y-direction running perpendicular to the transport direction, a first conveyor belt having first end moving back and forth together with the laser cutting device in the transport direction, a second conveyor belt having a second end opposite the first end and moving back and forth in the transport direction. The first and second ends are moved such that a laser beam generated by the laser cutting device is directed towards a gap formed between the first and second ends and extending in the y-direction. In order to avoid adhesions to
(Continued)

an underside of the sheet metal strip, at least one support strip and/or the dust discharge shaft is provided with a ventilation device for ventilating the gap.

20 Claims, 7 Drawing Sheets

(51) Int. Cl.
    *B23K 26/02*     (2014.01)
    *B23K 26/08*     (2014.01)
    *B26D 1/60*     (2006.01)
    *B23K 26/70*     (2014.01)
    *B26D 7/20*     (2006.01)

(52) U.S. Cl.
    CPC ........ *B23K 26/0876* (2013.01); *B23K 26/702* (2015.10); *B23K 37/0408* (2013.01); *B26D 1/60* (2013.01); *B26D 1/605* (2013.01); *B26D 2007/206* (2013.01)

(58) Field of Classification Search
    CPC ............ B23K 26/0876; B23K 26/0884; B23K 26/16; B23K 26/38; B23K 37/0408; B23K 37/47; B23K 26/083; B23K 26/0846; B23K 26/0869
    USPC .................................................... 219/121.67
    See application file for complete search history.

(56) References Cited

U.S. PATENT DOCUMENTS

| | | | |
|---|---|---|---|
| 5,224,406 A * | 7/1993 | Nasu ...................... | B26D 7/018 |
| | | | 83/422 |
| 10,179,376 B2 * | 1/2019 | Deiss ..................... | B23K 26/38 |
| 2016/0311069 A1 * | 10/2016 | Deiss ................. | B23K 37/0235 |

FOREIGN PATENT DOCUMENTS

| | | |
|---|---|---|
| EP | 1 586 407 A1 | 10/2005 |
| WO | 95/15837 A1 | 6/1995 |
| WO | 2007/028576 A2 | 3/2007 |
| WO | 2015/037162 A1 | 3/2015 |

OTHER PUBLICATIONS

PCT/ISA/237, "Written Opinion of the International Searching Authority for International Application No. PCT/EP2016/068085," dated Oct. 24, 2016.

PCT/IPEA/409, "International Preliminary Report on Patentability for International Application No. PCT/EP2016/068085," dated Oct. 17, 2017.

PCT/IPEA/416 & 409, "Written Opinion of IPEA for International Application No. PCT/EP2016/068085", dated Oct. 17, 2017.

* cited by examiner

DEVICE FOR CUTTING SHEET METAL PLATES OUT OF A SHEET METAL STRIP

RELATED APPLICATIONS

The present application is National Phase of International Application No. PCT/EP2016/068085 filed Jul. 28, 2016, and claims priorities from German Application No. 10 2015 217 639.8, filed Sep. 15, 2015, and German Application No. 10 2015 218 649.0, filed Sep. 28, 2015, the disclosure of which is hereby incorporated by reference herein in its entirety.

The invention relates to a device for cutting sheet metal plates out of a sheet metal strip according to the preamble of claim 1.

A device of this kind is known from DE 10 2004 034 256 A1.

A further device is known from EP 1 586 407 A1. Here, a dust discharge shaft is provided in a discharge direction pointing away from a laser cutting device and a dust collection container is secured to said dust discharge shaft. The dust discharge shaft and the dust collection container attached thereto are moved together with the laser cutting device in order to remove and collect cutting dust that accumulates during the laser cutting of sheet metal. In the case of the known device it is disadvantageous that cutting dust adheres or welds to an underside, facing the discharge direction, of a sheet metal piece cut out of the sheet metal strip. The cutting dust must then be removed from the sheet metal piece. This is complex.

DE 10 2011 051 170 A1 discloses a workpiece support for a processing machine. The workpiece support has support surfaces that can be moved in and against the transport direction and which are formed by workpiece support chains. A gap is provided between the support surfaces, in which gap a beam-catching device can be moved back and forth in the y-direction. An upper side of the beam-catching device facing towards the sheet metal plate is used to support the workpiece. In order to avoid an undesirable movement of the workpiece relative to the laser cutting device, it is provided that the workpiece support chain is made of plastic or is coated with plastic. Alternatively or additionally, the chain links of the workpiece support chain can be equipped with spherical supports.

The object of the invention is to overcome the disadvantages according to the prior art. In particular, a device that can be easily produced shall be described, with which sheet metal pieces can be produced without significant adhesions of cutting dust.

This object is achieved by the features of claim 1. Expedient embodiments of the invention will emerge from the features of the dependent claims.

In accordance with the invention, it is proposed that a screen movable back and forth in the y-direction concurrently in alignment with the laser beam is provided in the gap.

In the sense of the present invention, the term "screen" is understood to mean an elongate element which covers the gap both in the y-direction and in the transport direction. An aperture is provided in the elongate element, which aperture is movable back and forth in the y-direction in alignment, preferably in central alignment, with the laser beam. Instead of one elongate element, two elongate elements can also be provided, between the mutually opposed ends of which there is formed an opening or the "aperture", which is movable back and forth in the y-direction in alignment with the laser beam.

Due to the provision of the screen movable back and forth in the gap in the y-direction, cutting dust is prevented from being flung out of the gap in the y-direction laterally of the laser beam, counter to the flow direction of a cutting gas exiting from the cutting nozzle, towards the underside of the sheet metal strip and adhering there.

The screen is expediently formed from metal members connected pivotably to one another, of which a first metal member has an aperture for the passage of the laser beam and second metal members have a cover. Here, a pivot axis of the metal members connected to one another runs approximately in the transport direction. For example, the screen can be formed in the manner of a bicycle chain, which is guided at each of the two ends of the gap over a sprocket for the movement back and forth. One of the chain members can be provided for the passage of the laser beam, whereas the other chain members can be provided with the cover, which opposes the passage of cutting dust in the direction of the underside of the sheet metal strip.

It is also possible for the screen to be formed from a toothed belt or a stainless steel belt, which are provided with an aperture for the passage of the laser beam. The toothed belt can have a metal insert in the region of the aperture.

In accordance with a further embodiment a drive device is provided, by means of which the screen can be moved back and forth. The drive device can comprise at least one driven sprocket, a driven roller, or the like. In order to drive the sprocket, the roller or the like, an electric motor, in particular a servomotor, can also be provided, which can be controlled depending on a position of the laser cutting device in the y-direction so that the aperture of the screen is always moved back and forth concurrently in alignment with the laser beam.

In accordance with a further embodiment, a first support means having a first support strip is provided at the first end of the first conveyor belt and a second support means having a second support strip opposite the first support strip is provided at the second end, so that the gap is formed between the first and the second support strip. The first and the second support strip support the sheet metal strip in the cutting region. Due to the provision of the first and the second support strip, damage to the conveyor belt caused by the laser beam is avoided. Apart from this, the support surfaces of the support strips lie in a plane in which the sheet metal strip is supported horizontally in the cutting region. This makes it possible to produce a particularly exact cut along a predefined cutting path.

A first movement plane is formed by an upper side of the first and/or second conveyor belt facing the sheet metal plate. The support surfaces facing the laser cutting device also lie advantageously in the first movement plane. The first movement plane is arranged above a second movement plane of the screen in the y-direction, which second movement plane is formed by a second screen upper side of the screen facing the laser cutting device.

In accordance with a further embodiment a support surface of the support strips facing the laser cutting device forms a first movement plane in the transport direction. The first movement plane is arranged above a second movement plane of the screen in the y-direction, which second movement plane is formed by a second screen upper side of the screen facing the laser cutting device. In other words, the second movement plane of the screen is arranged so that the screen, during the movement back and forth in the y-direction, is not in contact with the underside of the sheet metal strip. An undesirable movement of a sheet metal plate in the y-direction almost completely cut out from the sheet metal strip can thus be avoided. This in turn contributes to a particularly exact guidance of a cut along the predefined cutting path.

In accordance with a further embodiment a dust discharge shaft extending from at least one of the support strips in a discharge direction pointing away from the laser cutting device is provided. The dust discharge shaft also contributes to the fact that cutting dust discharged by the screen does not reach the underside of the sheet metal strip.

The at least one support strip and/or the dust discharge shaft are/is advantageously provided with a ventilation device for ventilating the gap.

Due to the provision of a ventilation device, a backflow forming in the direction of the underside of the cut sheet metal piece as the cutting dust is discharged through the discharge shaft can be easily avoided. The cutting dust is discharged substantially fully through the discharge shaft in the discharge direction. It is not necessary to remove cutting dust or dust from the underside of the cut sheet metal piece.

In accordance with an advantageous embodiment the ventilation device comprises ventilation channels, which are provided in a support face of the support strip facing the laser cutting device. The proposed embodiment can be produced particularly easily and economically.

The ventilation channels advantageously extend over a length of the support face extending in the transport direction. The ventilation channels can run in particular parallel and/or at an incline to the transport direction. They can have a curved or angled course.

The ventilation device can also comprise ventilation apertures, which penetrate at least one of the support strips and/or the dust discharge shaft. Ventilation apertures of this kind, for example bores or slits, also enable an additional ventilation beneath an underside of the sheet metal strip and a sheet metal piece cut out therefrom, in such a way that there is no forming of an undesired backflow of the cutting dust formed during the cutting of the sheet metal strip.

The ventilation according to the invention of at least one support strip and/or the discharge shaft can be "passive" or "active". In the case of passive ventilation, air is aspirated by the ventilation device. The air is aspirated by means of a Venturi effect, which is produced as a result of the cutting gas flow directed in the discharge direction and caused by the cutting gas. In the case of "active" ventilation, air is blown through the ventilation device in the direction of the discharge shaft. In this case a higher flow rate is produced. The flow rate in this case can also be subject to open-loop or closed-loop control. For active ventilation, a fan for supplying air to the ventilation channels and/or ventilation apertures can be provided in particular. The fan can also be a suction fan, which is provided downstream of the dust discharge shaft and generates a suction flow through the screen.

In accordance with a further embodiment of the invention the dust discharge shaft has a cross-section that widens in the discharge direction. This also prevents an undesirable backflow of cutting dust from forming in the direction of the underside of the sheet metal.

The support strips and/or the dust discharge shaft and/or the screen are expediently made of copper or an alloy containing substantially copper. It has been found that the adhesion of cutting dust to copper materials is particularly low. The ventilation channels and/or ventilation apertures and/or the screen in this case do not become loaded with cutting dust, not even with a long service life. Proper ventilation can thus always be ensured.

The dust discharge shaft can be connected to a container for collecting cutting dust.

The dust discharge shaft and the screen can be attached only to one of the two support strips. In this case, the dust discharge shaft can be moved together with the slit in a simple way.

The dust discharge shaft is advantageously formed by two walls extending in the discharge direction. The walls extend for example substantially in a direction perpendicular to the transport direction. At least one wall, preferably both walls, can be attached to one of the support strips. Apertures connected to the fan can be provided in the side edge regions of the dust discharge channel in order to form an air sword. Cutting dust can thus be prevented from passing into the edge regions of the sheet metal strip on an upper side thereof or on the upper side of sheet metal parts cut out therefrom. Instead of the air sword, side walls can also be provided, which run approximately in the transport direction and are attached to at least one of the two mutually opposed walls.

In the device according to the invention a first conveying means is advantageously arranged upstream of the first support means. A second conveying means can also be arranged downstream of the second support means. This enables a transport, in particular a continuous transport, of the sheet metal strip over the slit formed between the support strips. The first conveying means can comprise a roller levelling machine, for example. The first and/or the second conveying means can also comprise a conveyor belt and/or a roller conveyor.

Exemplary embodiments of the invention will be explained in greater detail hereinafter on the basis of the drawings, in which:

FIG. 5b shows a detailed view according to FIG. 5a,

FIGS. 1 to 5b show devices in which, for the sake of clarity, the screen movable back and forth in the y-direction has been omitted.

Figure 1:
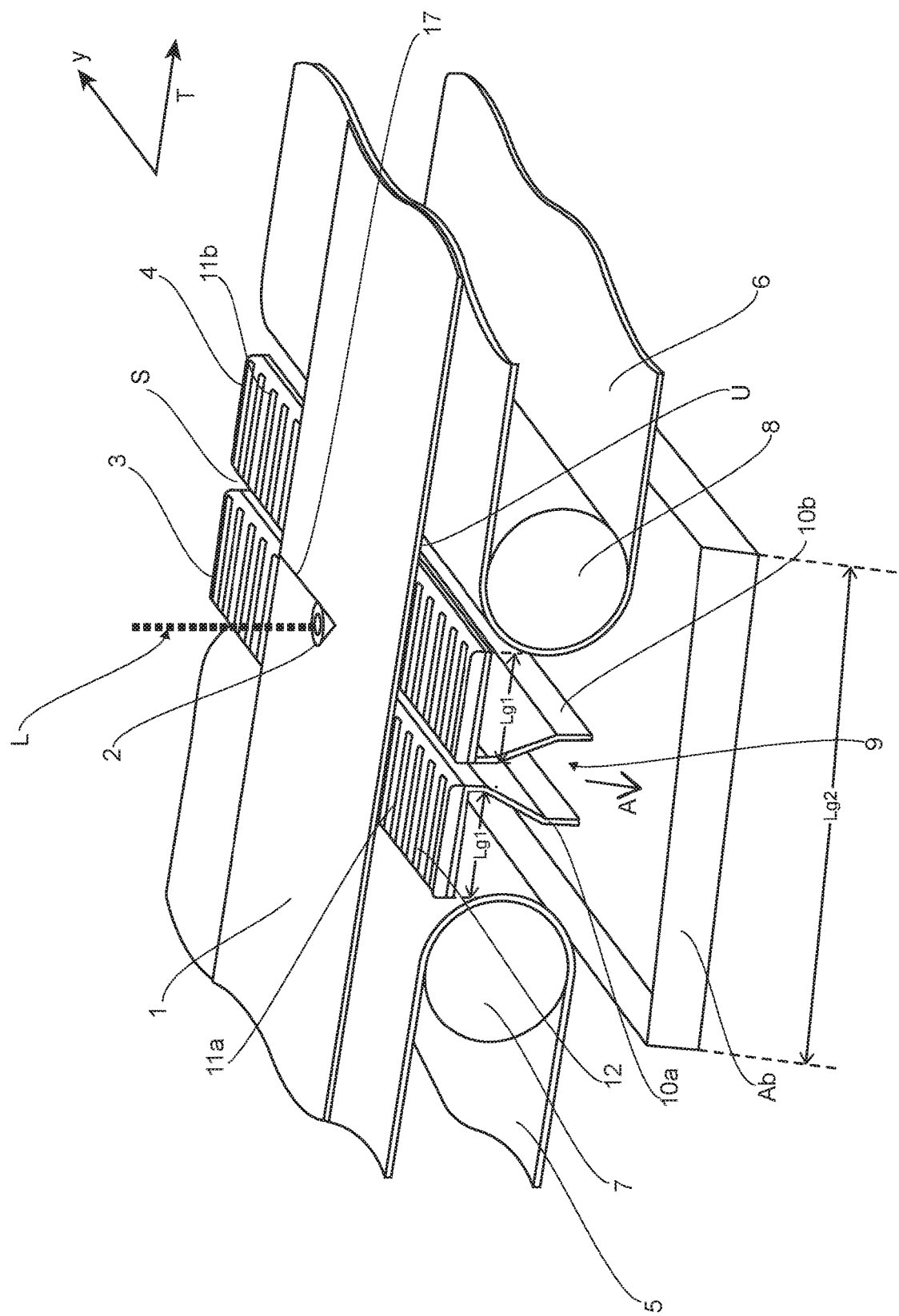
FIG. 1 shows a perspective partial view of a first device.

In the case of the first device, shown in FIG. 1, for cutting sheet metal plates out of a sheet metal strip 1, a transport direction of the sheet metal strip 1 is denoted by reference sign T. Reference sign 2 denotes a cutting nozzle of a laser cutting device (not shown here). The cutting nozzle 2 is movable in the transport direction T and in a y-direction perpendicular thereto by means of a conventional movement device, so that sheet metal pieces having a predefined contour can be cut out from the sheet metal strip 1. In so doing the sheet metal strip 1 can be moved continuously in the transport direction T.

The cutting nozzle 2 is designed so that cutting gas and a laser beam L can be guided towards the sheet metal strip 1 thereby. The sheet metal strip 1 is supported in the cutting region on a first support strip 3 and a second support strip 4 arranged opposite. The first 3 and the second support strip 4 extend approximately in the y-direction. A gap S is formed between the support strips 3, 4, through which gap a laser beam L passes. The first 3 and the second support strip 4 are movable by means of a conventional device (not shown here in greater detail) together with the cutting nozzle 2. For this purpose, the first support strip 3 can be connected to a first conveyor means, for example a first belt conveyor 5, arranged upstream thereof. Similarly, the second support strip 4 can be connected to a second conveyor means, for example a second belt conveyor 6, arranged downstream thereof. Mutually opposed first 7 and second deflection pulleys 8 of the belt conveyors 5, 6 can be movable in a conventional manner together with the cutting nozzle 2 of the laser cutting device, with the gap S being formed. Reference is made in this regard by way of example to DE 10 2004 034 256 A1, the disclosure of which is incorporated herein in this regard.

Reference sign 9 generally denotes a discharge shaft, which extends in a discharge direction A pointing away from an underside U of the sheet metal strip 1. The discharge shaft 9 is formed here by two walls 10a, 10b extending in the discharge direction A. The first wall 10a is attached to the first support strip 3 and the second wall 10b is attached to the second support strip 4. The walls 10a, 10b extend in the y-direction. They are formed such that a gap width of the gap S formed therebetween widens in the discharge direction A. The support strips 3, 4 can also be formed in one piece with the respective walls 10a, 10b.

It is also possible that both walls 10a, 10b are connected to one another by means of connecting walls (not shown here) extending in the transport direction T. Connecting walls of this kind are expediently provided laterally outside a cutting region in the y-direction. In this case the discharge shaft 9 can be attached by means of just one of the two walls 10a or 10b to the corresponding support strip 3 or 4.

The first 3 and the second support strip 4 each have a support face 11a, 11b facing the cutting nozzle 2. Each of the support faces 11a, 11b is provided with ventilation channels 12 extending approximately in the transport direction T. The ventilation channels 12 extend here over the entire first length Lg1 of the support strips 3, 4, so that when a sheet metal strip 1 is resting on the support faces 11a, 11b, air can be supplied to the gap S through the ventilation channels 12.

Reference sign B denotes a container which is arranged downstream of the discharge shaft 9 in the discharge direction A. The container B is not connected here to the discharge shaft 9, i.e. the container B is fixed in position relative to the discharge shaft 9. A second length Lg2 of the container B extends in the transport direction T at least over a predefined movement range of the discharge shaft 9 moved concurrently. With fixed container B, the masses to be moved concurrently can be kept small. In this case, the gap S can be moved particularly quickly and accurately together with the laser beam L.

Figure 2:
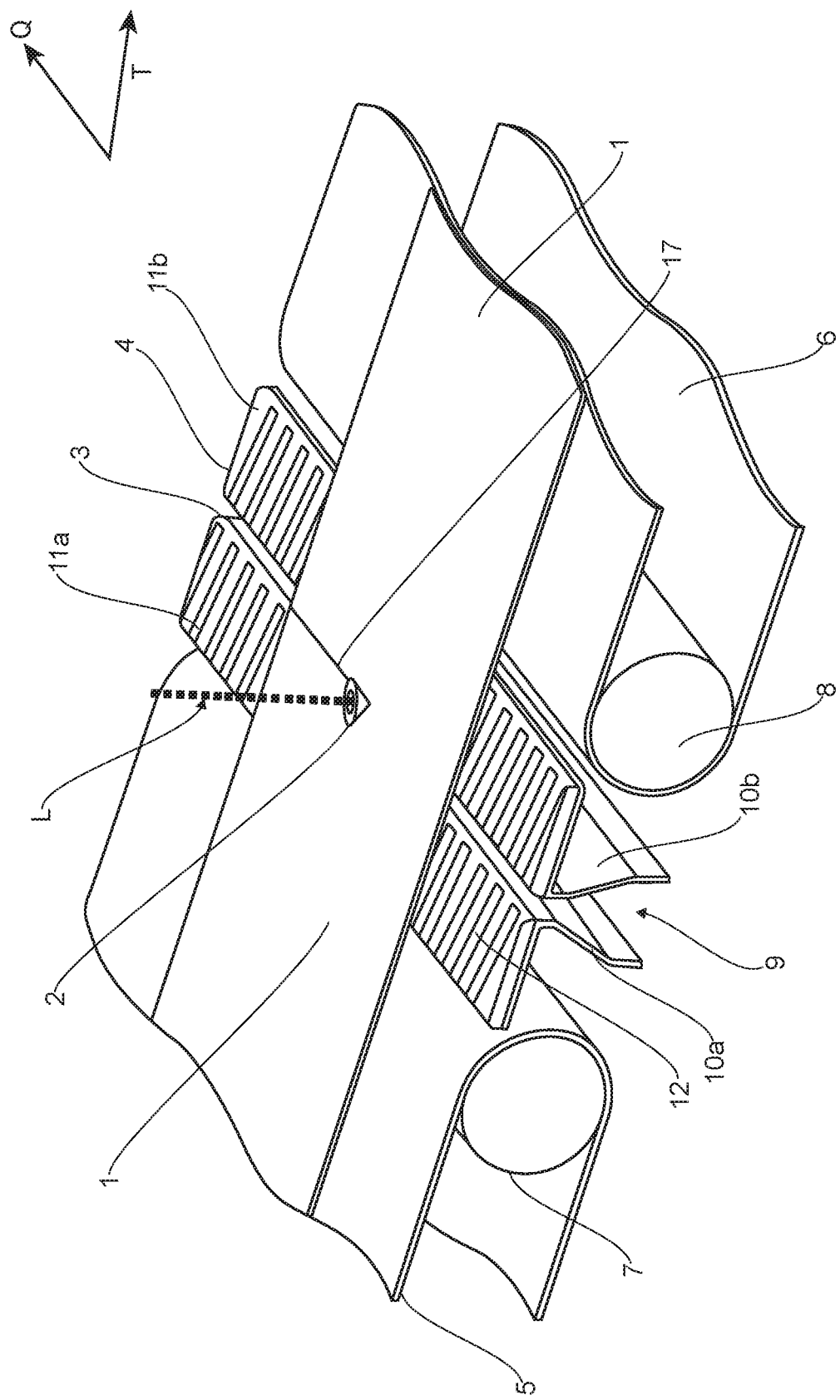
FIG. 2 shows a perspective partial view of a second device.

In the case of the second device shown in FIG. 2, the ventilation channels 12 run at an incline to the transport direction T. They extend over the total first length Lg1 of the first 11a and the second support face 11b of the support strips 3, 4.

Figure 3:
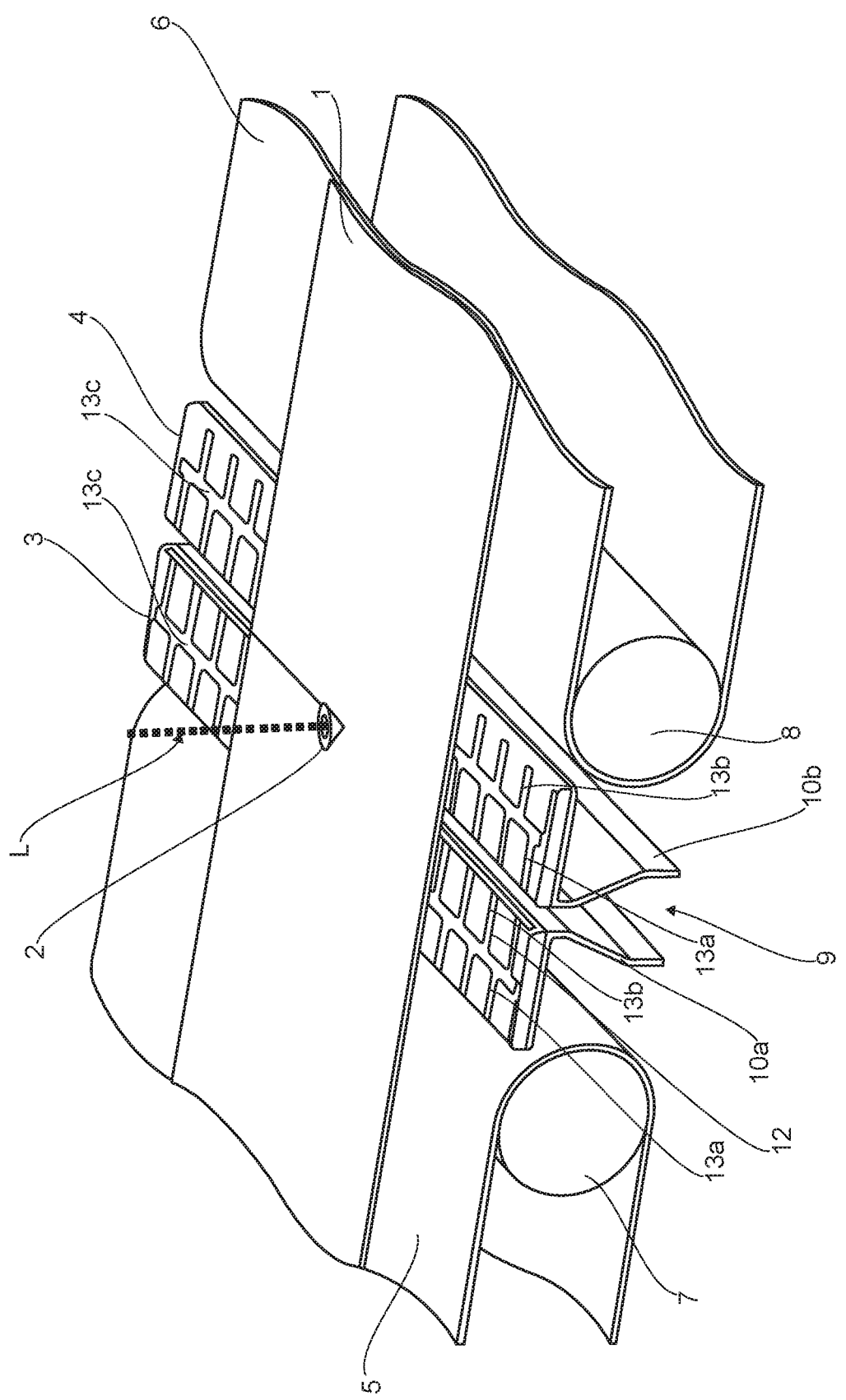
FIG. 3 shows a perspective partial view of a third device.

In the case of the third device shown in FIG. 3, the ventilation channels 12 are each divided into two portions 13a, 13b, which are arranged offset from one another in the transport direction T. The portions 13a, 13b are connected to one another via a connecting channel 13c running approximately in the y-direction.

Figure 4:
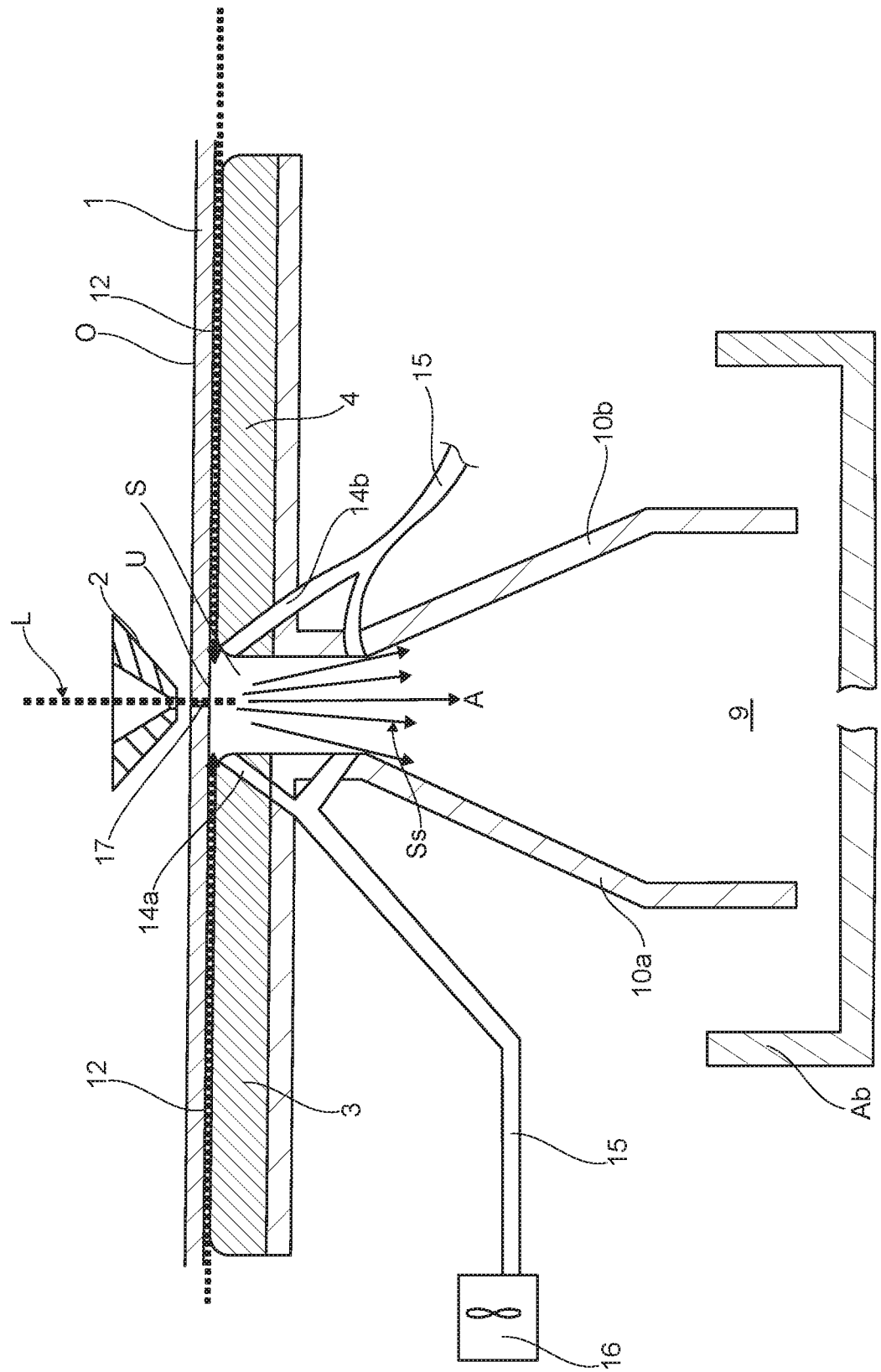
FIG. 4 shows a sectional view through a fourth device.

In the case of the fourth device shown in FIG. 4, the first support strip 3 is provided with a first ventilation aperture 14a and the second support strip 4 is provided with a second ventilation aperture 14b.

Figure 5B:
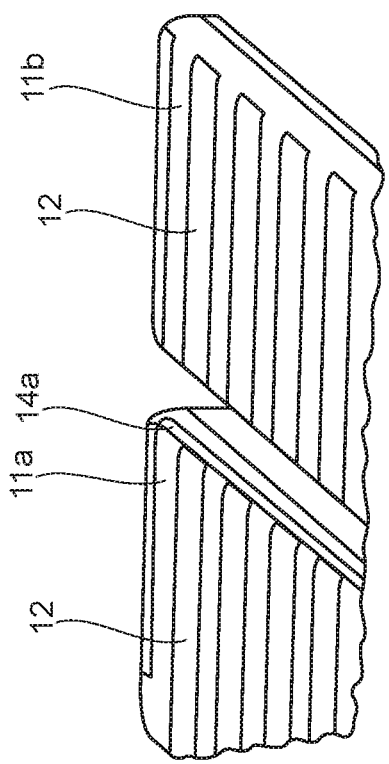
Figure 5A:
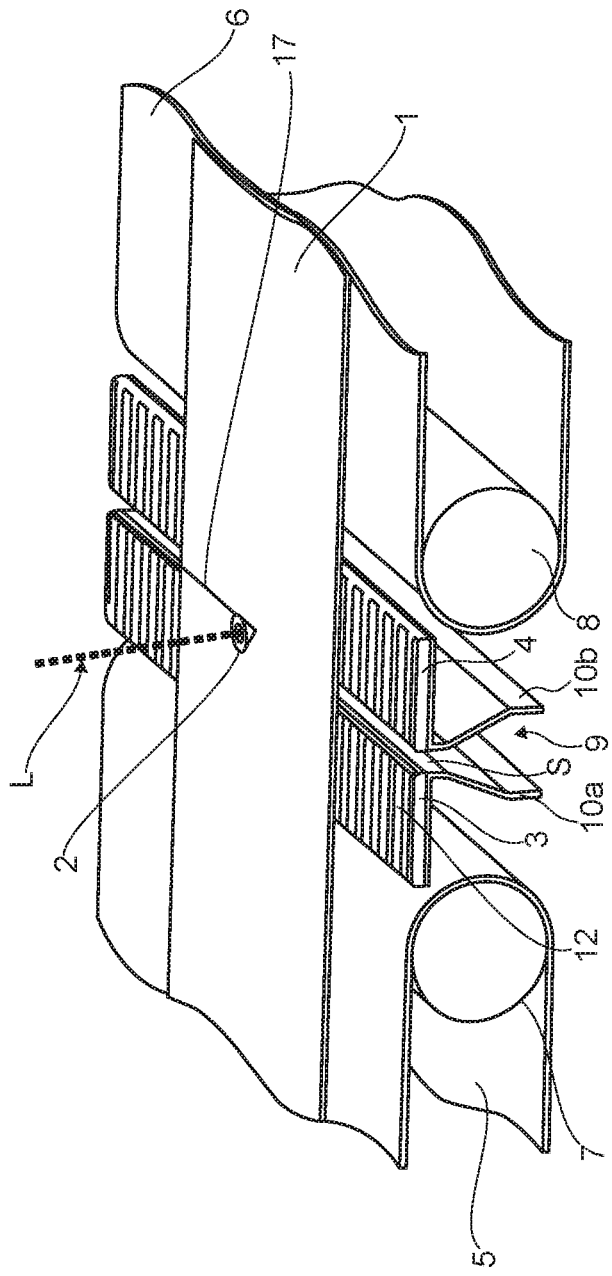
FIG. 5a shows a perspective partial view of a fifth device.

In the case of the fifth device shown in FIGS. 5a and 5b, the support strips 3, 4 have ventilation channels 12—as shown in FIG. 1. In addition, ventilation apertures 14a, 14b are provided in an edge region of the support strips 3, 4.

The ventilation apertures 14a, 14b can be connected here by means of lines 15 (indicated merely schematically) to a fan 16 (likewise indicated schematically).

The function of the device will now be explained in greater detail on the basis of FIGS. 5a and 5b.

Cutting gas exits from the cutting nozzle 2 as the sheet metal strip 1 is being cut. A flow of cutting gas is formed, by means of which a cut 17 in the sheet metal strip 1 is directed in the direction of the gap S. Cutting dust Ss formed during the cutting process is discharged into the discharge shaft 9 with the cutting gas flowing in the discharge direction A. The flow of cutting gas causes a Venturi effect, by means of which air is suctioned through the ventilation channels 12 and/or the ventilation apertures 14a, 14b. As a result, the creation of a backflow directed in the direction of the underside U of the sheet metal strip 1 is avoided. Cutting dust Ss is not transported towards the underside U.

Compressed air can also be blown into the cutting gap S through the ventilation apertures 14a, 14b by means of the fan 16 via the lines 15. The creation of a backflow towards the underside U can thus be avoided even more effectively. A mass flow of the air supplied in particular by the ventilation apertures 14a, 14b can be controlled for example depending on a gap width of the gap S. To this end, at least one control valve (not shown here) can be arranged downstream of the fan 16.

The ventilation apertures 14a, 14b can also be arranged in the y-direction laterally outside a cutting region. An air sword can thus be produced in this region by means of compressed air. A lateral escape of cutting dust Ss and soiling of an upper side O opposite the underside U of the sheet metal strip 1 can be avoided by means of the air sword. Connecting walls are not necessary in this case.

In accordance with a further embodiment not illustrated separately in the drawings, it can also be that a cold trap is provided downstream of the gap S, in particular in the region of the first 10a and the second wall 10b. The cold trap can be formed for example by a multiplicity of nozzles provided in the first wall 10a and/or the second wall 10b, through which nozzles cold air, in particular dry cold air, or cold nitrogen, which is produced expediently by evaporation of liquid nitrogen, is blown in. The cold trap can of course also be designed differently. For example, one or more lines running in the y-direction can be provided in the region of the walls 10a, 10b or the discharge shaft 9, through which lines a coolant is passed.

By guiding the cutting dust Ss downstream into or through a cold trap, the cutting dust particles are cooled down. It has been found that cold cutting dust particles have a lower tendency to adhere to the underside U of the sheet metal strip.

It can also be that the ventilation device 12, 13a, 13b, 13c, 14a, 14b is omitted and instead the device for cutting sheet metal plates is provided merely with a cold trap arranged downstream of the gap S.

Figure 6:
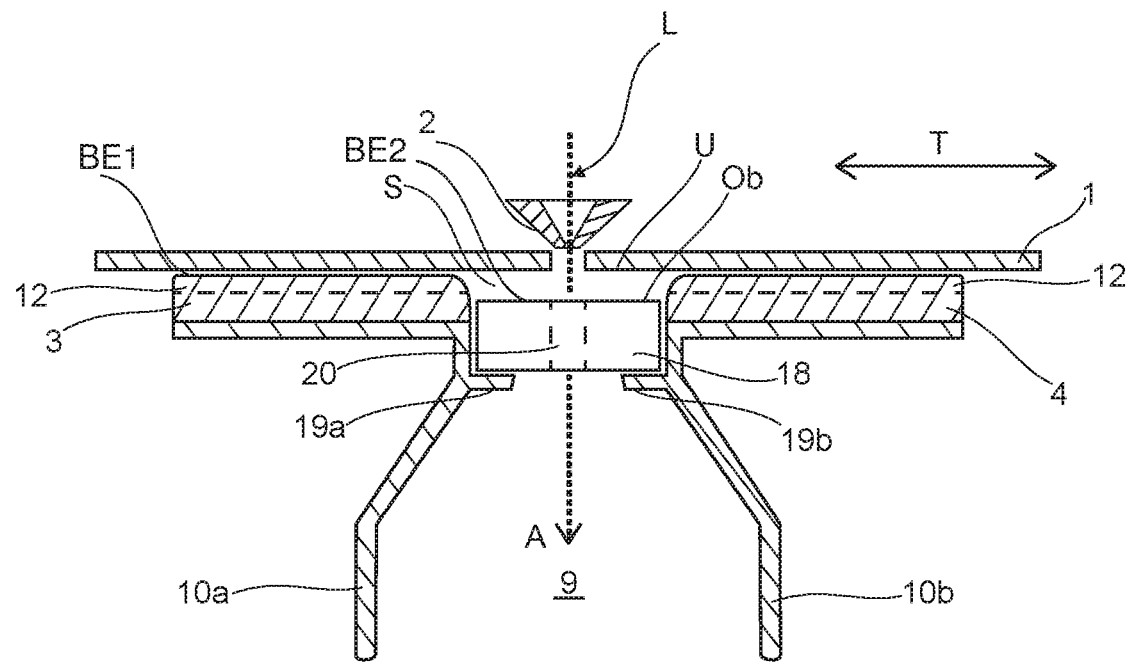
FIG. 6 shows a schematic cross-sectional view through a sixth device.

The sixth device shown schematically in cross-section in FIG. 6 has, in the gap S, a screen 18 movable back and forth in the y-direction, which screen for example is supported on first 19a and second shoulders 19b extending from the first wall 10a and the second wall 10b. A screen upper side Ob facing towards the cutting nozzle 2 forms a second movement plane BE2. The sheet metal strip 1 lies by means of its underside U in the first movement plane BE1, whereas the second movement plane BE2 is distanced from the underside of the sheet metal strip 1.

The screen 18 is substantially closed in the y-direction. It has an aperture 20 for passage of the laser beam L.

Figure 7:
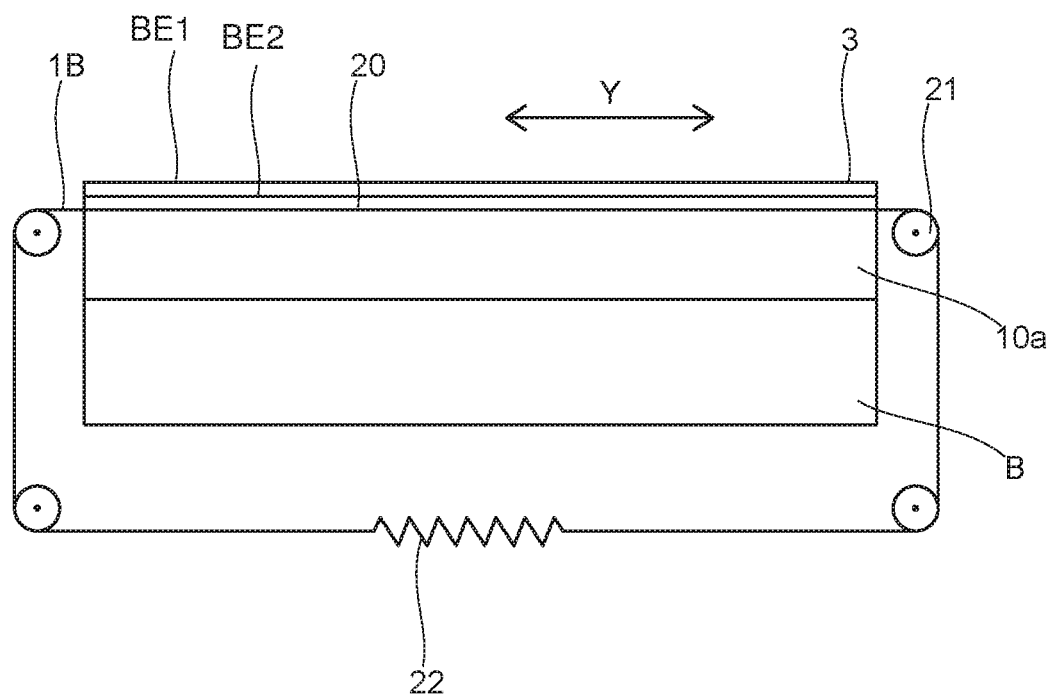
FIG. 7 shows a schematic cross-sectional view through a seventh device.

FIG. 7 shows a sectional view through the gap S parallel to the y-direction. The screen 18 is guided around further deflection pulleys 21, one of which is driven by a drive device (not shown here in greater detail), for example a servomotor. Reference sign 22 denotes a tensioning device, by means of which the screen 18 is held in a tensioned manner. In the present exemplary embodiment, a further container B1 is arranged downstream of the walls 10a, 10b (not visible here) and for example can be tubular.

Figure 8:
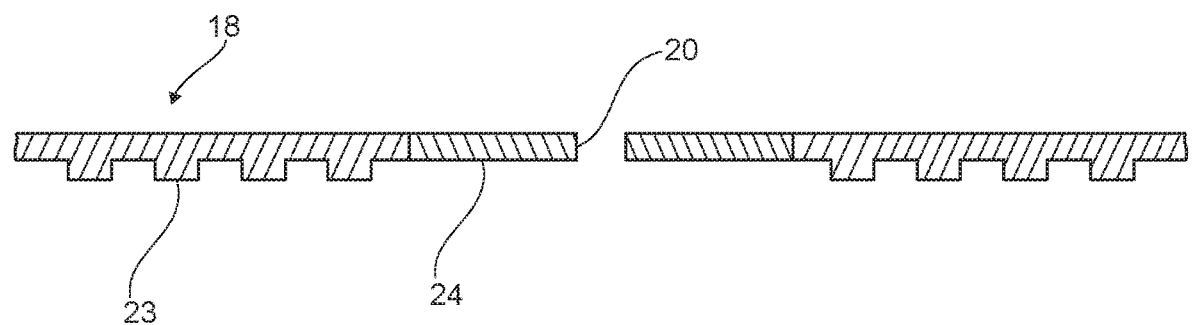
FIG. 8 shows a schematic sectional view through a screen.

FIG. 8 shows a schematic cross-sectional view through an exemplary embodiment of a screen 18. The screen 18 is formed here from a toothed belt 23, which is produced from a temperature-resistant polymer. Reference sign 24 denotes an insert inserted into the toothed belt 23, which insert is made for example of metal. The aperture 20 is provided in the insert 24.

Figure 9:
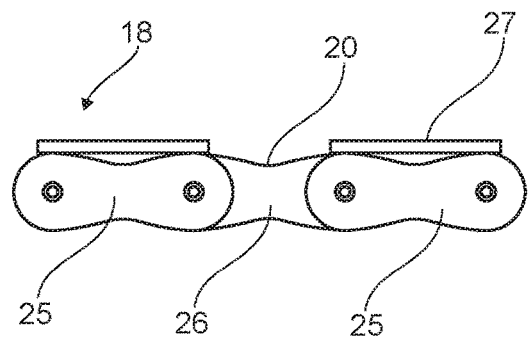
FIG. 9 shows a schematic partial sectional view through a further screen.

As can be seen from FIG. 9, the screen 18 can also be formed from first metal members 25 connected to one another pivotably in the manner of a chain, with a second metal member 26 being arranged therebetween. The first metal members 25 are each provided with a cover 27. The cover 27 is omitted in the case of the second metal member 26, so that here the aperture 20 is formed for the passage of the laser beam L.

The further function of the device is as follows:

The screen 18 accommodated in the gap S is moved back and forth in the transport direction T together with the support strips 3, 4 in the transport direction concurrently with the cutting nozzle 2. Apart from that, the screen is moved back and forth in the y-direction concurrently with the cutting nozzle 2, so that the laser beam L exiting through the cutting nozzle 2 is always in alignment with the aperture 20. For this purpose, one of the further deflection pulleys 21, which for example can be formed as a sprocket or toothed belt disc, can be provided with a drive device. The drive device is, for example, a servomotor or actuator, which is connected to a controller. The controller is used both to control the laser cutting device in the y-direction and to control the screen 18 in the y-direction, more specifically in such a way that the laser beam L is always directed towards the aperture 20 of the screen 18.

LIST OF REFERENCE SIGNS 1 sheet metal strip
2 cutting nozzle
3 first support strip
4 second support strip
5 first belt conveyor
6 second belt conveyor
7 first deflection pulley
8 second deflection pulley
9 discharge shaft
10a first wall
10b second wall
11a first support face
11b second support face
12 ventilation channel
13a, b portion
13c connection channel
14a first ventilation aperture
14b second ventilation aperture
15 line
16 fan
17 cut
18 screen
19a first shoulder
19b second shoulder
20 aperture
21 further deflection pulley
22 tensioning device
23 toothed belt
24 insert
25 first metal member
26 second metal member
27 cover
A discharge direction
B container
BE1 first movement plane
BE2 second movement plane
B1 further container
L laser beam
Lg1 first length
Lg2 second length
O upper side
Ob screen upper side
S gap
Ss cutting dust
T transport direction
U underside

The invention claimed is:

1. A device for cutting sheet metal plates out of a sheet metal strip (1), comprising:
   a laser cutting device (2) that can move back and forth in a transport direction (T) of the sheet metal strip (1) as well as in a y-direction running perpendicular to the transport direction,
   a first conveyor belt whose first end (7) can be moved back and forth together with the laser cutting device (2) in the transport direction (T),
   a second conveyor belt having a second end (8), which is opposite the first end (7) and which can be moved back and forth in the transport direction (T),
   wherein the first (7) and the second end (8) are moved in such a way that a laser beam (L) generated by the laser cutting device is directed towards a gap (S) formed between the first (7) and the second end (8) and extending in the y-direction,
   wherein a screen (18) movable back and forth in the y-direction concurrently in alignment with the laser beam (L) is provided in the gap (S),
   wherein a dust discharge shaft (9) extends in a discharge direction (A) pointing away from an underside (U) of the sheet metal strip (1),
   wherein the dust discharge shaft (9) is provided with a ventilation device for ventilating the gap (S), and
   wherein the ventilation device comprises ventilation apertures (14a, 14b), which penetrate the dust discharge shaft (9).

2. The device according to claim 1, wherein the screen (18) is formed from metal members (25, 26) connected pivotably to one another, of which first metal members (25) have covers (27) and a second metal member (26) has an aperture (20) for the passage of the laser beam (L).

3. The device according to claim 1, wherein the screen (18) is formed from a toothed belt (23) or a stainless steel belt, which are provided with an aperture (20) for the passage of the laser beam (L).

4. The device according to claim 1, wherein a drive device (21) is provided, by means of which the screen (18) can be moved back and forth.

5. The device according to claim 1, wherein a first support means having a first support strip (3) is provided at the first end (7) of the first conveyor belt and a second support means having a second support strip (4) opposite the first support strip (3) is provided at the second end (8), so that the gap (S) is formed between the first (3) and the second support strip (4).

6. The device according to claim 1, wherein an upper side of the first and/or second conveyor belt facing the sheet metal plate forms a first movement plane (BE1) in the transport direction (T) which is arranged above a second movement plane (BE2) of the screen (18) in the y-direction, wherein the second movement plane (BE2) is formed by a screen upper side (Ob) of the screen (18) facing the laser cutting device.

7. The device according to claim 1, wherein a support face (11a, 11b) of the support strips (3, 4) facing the laser cutting device forms a first movement plane (BE1) in the transport direction (T) which is arranged above a second movement plane (BE2) of the screen (18) in the y-direction, wherein the second movement plane (BE2) is formed by a screen upper side (Ob) of the screen (18) facing the laser cutting device.

8. The device according to claim 5, wherein the dust discharge shaft (9) extends from at least one of the support strips (3, 4) in a discharge direction (A) pointing away from the laser cutting device (2).

9. The device according to claim 5, wherein the at least one support strip (3, 4) is provided with a ventilation device (12, 13a, 13b, 13c, 14a, 14b) for ventilating the gap (S).

10. The device according to claim 9, wherein the ventilation device (12, 13a, 13b, 13c, 14a, 14b) comprises ventilation channels (12, 13a, 13b, 13c), which are provided in the support face (11a, 11b) of the support strip (3, 4).

11. The device according to claim 10, wherein the ventilation channels (12, 13a, 13b, 13c) extend over a length (Lg1) of the support face (11a, 11b) extending in the transport direction (T).

12. The device according to claim 10, wherein the ventilation channels (12, 13a, 13b, 13c) run parallel or at an incline to the transport direction (T).

13. The device according to claim 9, wherein the ventilation apertures (14a, 14b) penetrate the support strips (3, 4).

14. The device according to claim 10, wherein a fan (16) is provided for supplying air to the ventilation channels (12, 13a, 13b, 13c) and/or ventilation apertures (14a, 14b).

15. The device according to claim 1, wherein the dust discharge shaft (9) has a cross-section that widens in the discharge direction (A).

16. The device according to claim 1, wherein the support strips (3, 4) and/or the dust discharge shaft (9) are/is made of copper or an alloy containing substantially copper.

17. The device according to claim 1, wherein the dust discharge shaft (9) is connected to a container (B) for collecting cutting dust (Ss).

18. The device according to claim 5, wherein the dust discharge shaft (9) is connected only to one of the two support strips (3, 4).

19. The device according to claim 5, wherein the dust discharge shaft (9) is formed by two walls (10a, 10b) extending in the discharge direction (A), wherein at least one of the walls (10a, 10b) is attached to one of the support strips (3, 4).

20. The device according to claim 14, wherein the ventilation apertures (14a, 14b) connected to the fan (16) are provided in the edge region of the dust discharge shaft (9) in order to form an air sword.

* * * * *